(12) United States Patent
Kim

(10) Patent No.: US 7,288,337 B2
(45) Date of Patent: Oct. 30, 2007

(54) BATTERY PACK FOR PORTABLE ELECTRONIC EQUIPMENT

(75) Inventor: Jong-Sam Kim, Ahsan (KR)

(73) Assignee: Samsung SDI Co., Ltd., Suwon (KR)

( * ) Notice: Subject to any disclaimer, the term of this patent is extended or adjusted under 35 U.S.C. 154(b) by 585 days.

(21) Appl. No.: 10/394,019

(22) Filed: Mar. 24, 2003

(65) Prior Publication Data

US 2003/0194603 A1   Oct. 16, 2003

(30) Foreign Application Priority Data

Apr. 15, 2002   (KR) .................. 10-2002-0020395

(51) Int. Cl.
*H01M 10/44* (2006.01)
(52) U.S. Cl. .................. 429/125; 429/209; 320/128; 320/134
(58) Field of Classification Search ............. 429/159, 429/125, 121
See application file for complete search history.

(56) References Cited

U.S. PATENT DOCUMENTS 5,796,238 A * 8/1998 Hiratsuka et al. ......... 320/112
6,072,299 A * 6/2000 Kurle et al. ............... 320/112
6,492,058 B1 * 12/2002 Watanabe et al. .......... 429/121
2002/0131239 A1 * 9/2002 Ashiya et al. ............. 361/719
2003/0013013 A1 * 1/2003 Nakamura ................. 429/159

FOREIGN PATENT DOCUMENTS

JP  2002-008608   *  1/2002
KR  00233488 B1      9/1999

* cited by examiner

*Primary Examiner*—Patrick Joseph Ryan
*Assistant Examiner*—Tony Chuo
(74) *Attorney, Agent, or Firm*—H.C. Park & Associates, PLC

(57) ABSTRACT

A rechargeable battery pack for portable electronic equipment is includes a battery coupled to a charge/discharge circuit and includes a a first substrate for mounting parts positioned on a high-current path and a second substrate for mounting peripheral circuits for controlling a charge/discharge of the battery. Accordingly, heat sensitive parts on low current paths may be thermally isolated from heat generating parts on high current paths.

13 Claims, 3 Drawing Sheets

BATTERY PACK FOR PORTABLE ELECTRONIC EQUIPMENT

BACKGROUND OF THE INVENTION (a) Field of the Invention

The present invention relates to a battery pack for a portable electronic equipment. More specifically, the present invention relates to a battery pack that isolates high-current parts and reduces the effect of heat generated from the high-current parts.

(b) Description of the Related Art

Rechargeable secondary batteries have been studied frequently with the development of portable electronic equipment such as cellular phones, notebook computers, camcorders, personal digital assistants (PDA), and the like. The various kinds of secondary batteries that have been developed include Ni—Cd batteries, lead batteries, nickel metal hydride (NiMH) batteries, lithium ion batteries, lithium polymer batteries, lithium metal batteries, air zinc batteries, etc.

Secondary batteries may be combined with a charger/discharger circuit to form a battery pack. The battery pack uses an external terminal for charge/discharge. Conventional battery packs have parts in the charger/discharger circuit that are located on a high-current path. Parts located on a high-current path emit heat, which has an adverse effect on the peripheral integrated circuit chips of the charger/discharger circuit and may cause a malfunction or deteriorate the stability of the battery pack and reduce the energy efficiency of the battery pack.

SUMMARY OF THE INVENTION

The present invention provides a battery pack for portable electronic equipment that isolates parts of the battery pack located on a high-current path from the other parts of the charger/discharger circuit, thereby reducing the effect of the current-induced heat on the other circuit parts.

In accordance with an embodiment of the present invention, a battery pack is provided that includes a battery that is chargeable with an external power source. The battery pack may include a positive (+) battery pack terminal and a negative (−) battery pack terminal for coupling to the external power source, for charging the battery, and for supplying the power of the battery to an external load. In accordance with preferred embodiments, the invention includes a first substrate for mounting parts positioned on a high-current path and a second substrate for mounting peripheral circuits for controlling charge/discharge of the battery.

In the battery pack, parts positioned on the high-current path are mounted on the first substrate and peripheral circuits for controlling charge/discharge of the battery are mounted on the second substrate, thereby preventing the effect of heat generated due to the high current on the peripheral circuits embodied with integrated circuits. Accordingly, the present invention eliminates an adverse effect of heat in the controller circuit constituting the battery pack.

BRIEF DESCRIPTION OF THE DRAWINGS

The accompanying drawings, which are incorporated in and constitute a part of the specification, illustrate an embodiment of the invention and, together with the description, serve to illustrate principles of the invention.

DETAILED DESCRIPTION OF THE PREFERRED EMBODIMENTS

In the following detailed description, the invention is shown and described in accordance with certain preferred embodiments illustrating the best mode contemplated by the inventor(s) of carrying out the invention. As will be realized to those skilled in the art, the invention may be modified in various obvious respects, all without departing from the invention. Accordingly, the drawings and description are to be regarded as illustrative in nature, and not restrictive.

Figure 1:
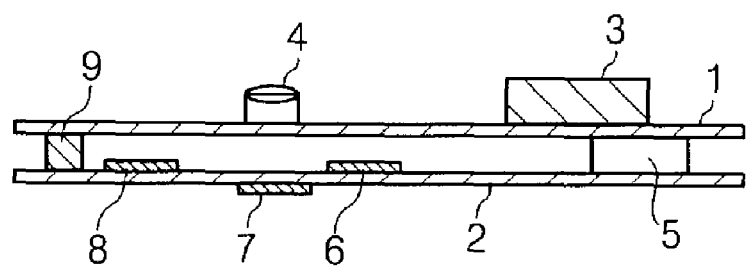
FIG. 1 is a cross-sectional view of a substrate for a battery pack in accordance with an embodiment of the present invention.

With reference to FIG. 1, a battery pack is illustrated in accordance with an embodiment of the present invention. The battery pack includes a first substrate 1 spaced a distance from a second substrate 2. Parts positioned on a charge/discharge path of the battery pack that experience high current flows, such as a coil, a fuse, capacitors, and transistors for switching, are mounted on the first substrate 1. As shown in FIG. 1, an external connector 3 and a coil 4 of the battery pack are mounted on the first substrate 1. The external connector has a positive (+) terminal and a negative (−) terminal. It is used to couple the battery pack to a power source during charging, and to portable electronic equipment during discharging. For clarity, not all parts of the circuit experiencing a high current flow are illustrated in FIG. 1. In a preferred embodiment, all parts of the circuit that experience a high current flow are preferably mounted on the first substrate 1.

Parts of the charge/discharge circuit that do not experience high current flows, i.e., low current flow parts, such as integrated circuit chips 6, 7, and 8 are mounted on second substrate 2. By mounting parts that experience high current flows on the first substrate and low current flow parts of the circuit on the second substrate, the high current flow parts are effectively thermally isolated from other parts of the circuit. The first substrate and the second substrate should be spaced a distance apart from one another such that heat generated from the parts on the first substrate does not significantly affect the parts on the second substrate. The exact distance between the first substrate 1 and the second substrate 2 is not critical as long as the distance is sufficient to reduce the effect of heat generated by parts on the first substrate on parts mounted on the second substrate.

The parts on the first substrate 1 and the parts on the second substrate 2 are in electrical signal communication with one another through one or more interlayer connectors. As shown in FIG. 1, a first interlayer connector 5 and the second interlayer connector 9 is disposed between the first substrate 1 and the second substrate 2 and provides communication between parts on the first substrate 1 and the second substrate 2.

Figure 2:
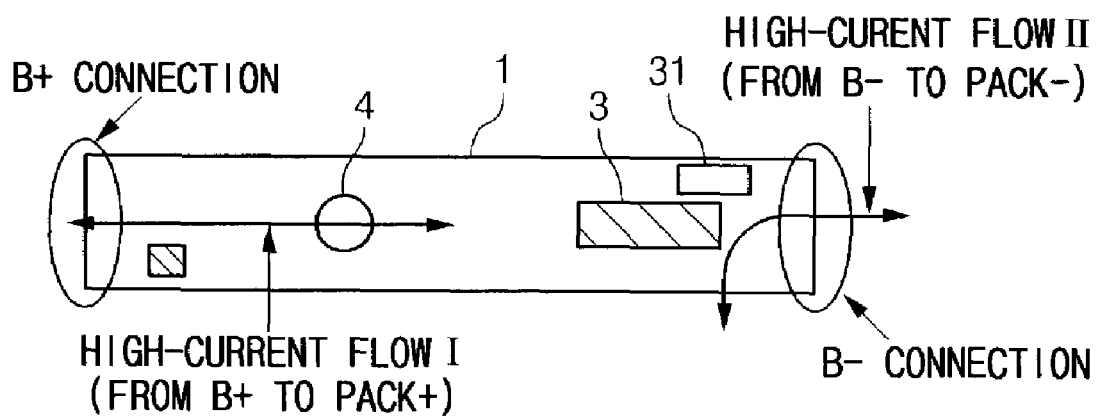
FIG. 2 is a diagram showing the current flow in the battery pack shown in FIG. 1.

FIG. 2 shows a high-current flow for the battery pack shown in FIG. 1. A sensor resistor 31 is shown as being mounted on the first substrate 1. The high-current flow includes a high-current flow I between the positive (+) terminal of the battery and the positive (+) terminal of the battery pack, and a high-current flow II between the negative (−) terminal of the battery and the negative (−) terminal of the battery pack. In FIG. 2, the right side of the first substrate 1 is coupled to the negative (−) terminal of the battery and the left side of the first substrate 1 is coupled to the positive (+) terminal of the battery. The positive (+) terminal of the battery pack is formed on the left side of the external connector 3 and the negative (−) terminal of the battery pack is formed on the right side of the external connector 3. Accordingly, the two high-current flows I and II are separated from each other and interference between them may be reduced.

Figure 3:
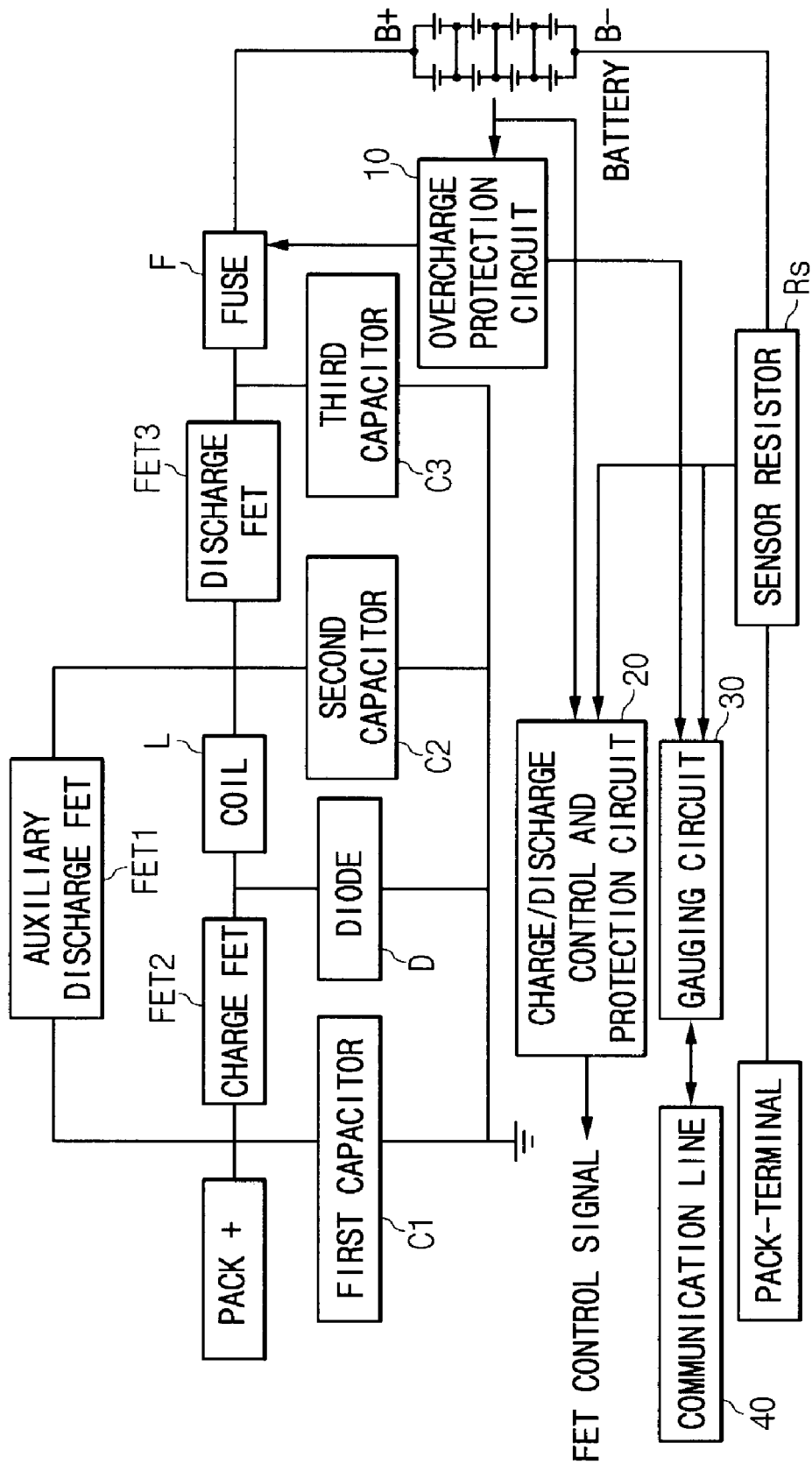
FIG. 3 is a schematic diagram of a battery pack according to certain embodiments of the present invention.

With reference now to FIG. 3, a battery pack according to an embodiment of the present invention is illustrated. The battery pack includes batteries and peripheral circuits. The battery illustrated in FIG. 3 includes two unit cells each composed of four serial batteries are coupled in parallel, i.e., in the form of 4S2P. The peripheral circuit of the battery pack includes a charge FET FET2, a coil L, a discharge FET FET3, and a fuse F sequentially coupled between the positive (+) terminal of the battery pack and the positive (+) terminal of the battery. An auxiliary FET FET1 is coupled in parallel with the charge FET FET2 and the coil L. A first capacitor C1 is couple to a node between the positive (+) terminal of the battery pack and the charge FET FET2, a second capacitor C2 is coupled to a node between the coil L and the discharge FET FET3, and a third capacitor C3 is coupled to a node between the discharge FET FET3 and the fuse F. A sensor resistor Rs is coupled between the negative (−) terminal of the battery and the negative (−) terminal of the battery pack. The battery pack may also include an overcharge protection circuit 10 for determining whether or not the battery is overcharged from the potential of a predefined cell of the battery. The battery pack may also include a gauging circuit 30 and a communication line 40 for informing an exterior state of charge of the battery from the outputs of the overcharge protection circuit 10 and the sensor resistor Rs. In a preferred embodiment, the battery pack further includes a charge/discharge control and protection circuit 20 for controlling the charge/discharge of the battery by turning on/off the respective FETs FET1, FET2, and FET3 based on the potential of the predefined cell of the battery and the output of the sensor resistor Rs.

As stated above, a high current flows to the parts positioned on a path between the positive (+) terminal of the battery pack and the positive (+) terminal of the battery, and also to the sensor resistor Rs positioned on a path between the negative (−) terminal of the battery pack and the negative (−) terminal of the battery. The parts positioned on these paths are mounted on the first substrate 1 shown in FIG. 1. The overcharge protection circuit 10, the charge/discharge control and protection circuit 20, the gauging circuit 30, and the communication line 40 in the circuit of FIG. 3 are preferably mounted on the second substrate 2 shown in FIG. 1. With this construction, the high-current parts are isolated from the parts operating with a low current, so that the heat generated from the high current hardly affects the overcharge protection circuit 10, the charge/discharge control and protection circuit 20, and the gauging circuit 30.

Figure 4:
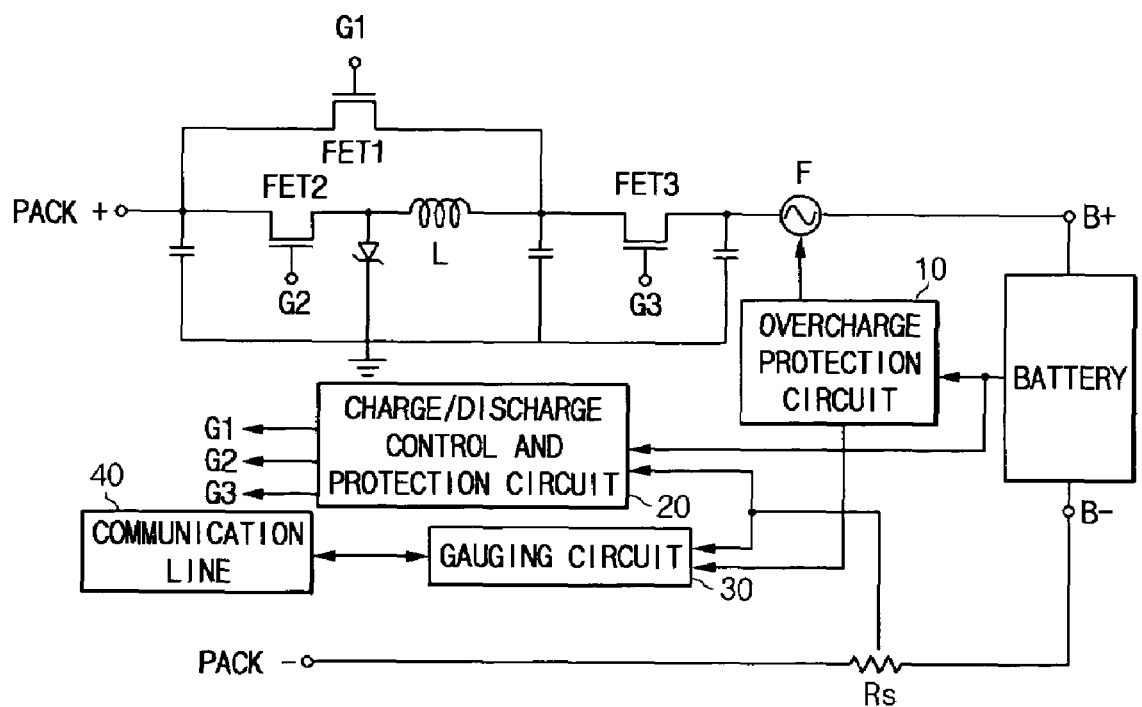
FIG. 4 is a schematic diagram of a battery pack according to another embodiment of the present invention.

FIG. 4 illustrates a circuit diagram for an embodiment of the present invention. The operation of the battery pack of the present invention will be described briefly with reference to FIG. 4.

The charge/discharge control and protection circuit 20 generates signals G1, G2, and G3 for turning on/off the transistors FET1, FET2, and FET3 according to the output of the sensor resistor Rs and the potential of a predefined cell of the battery. The signals G1, G2, and G3 are applied to the gate of the corresponding FETs.

During a charge, both FETs (FET2 and FET3) must be in the "on" state, because the current flows from the positive (+) terminal of the battery pack to the positive (+) terminal of the battery. The current path during a charge starts from the positive (+) terminal of the battery pack and ends at the positive (+) terminal of the battery via the transistor FET2, the coil L, the transistor FET3, and the fuse F.

During a discharge, all three FETs (FET1, FET2, and FET3) must be in the "on" state, because the current flows from the positive (+) terminal of the battery to the positive (+) terminal of the pack. There are two current paths during a discharge. One starts from the positive (+) terminal of the battery and ends at the positive (+) terminal of the battery pack via the fuse F, the transistor FET3, the coil L, and the transistor FET2. The other starts from the positive (+) terminal of the battery and ends at the positive (+) terminal of the battery pack via the fuse F, the transistor FET3, and the transistor FET1.

The overcharge protection circuit 10 detects the potential of a predefined cell of the battery, and when determining from the potential that the battery is overcharged, turns off both terminals of the fuse F. The gauging circuit 30 detects the state of charge of the battery using the outputs of the overcharge protection circuit 10 and the sensor resistor Rs, and sends the detected state of charge to the exterior through the communication line 40. The charge/discharge control and protection circuit 20 generates signals G1, G2, and G3 for controlling the on/off state of the FET elements FET1, FET2, and FET3 using the potential of the predefined cell of the battery and the output of the sensor resistor Rs.

Figure 5:
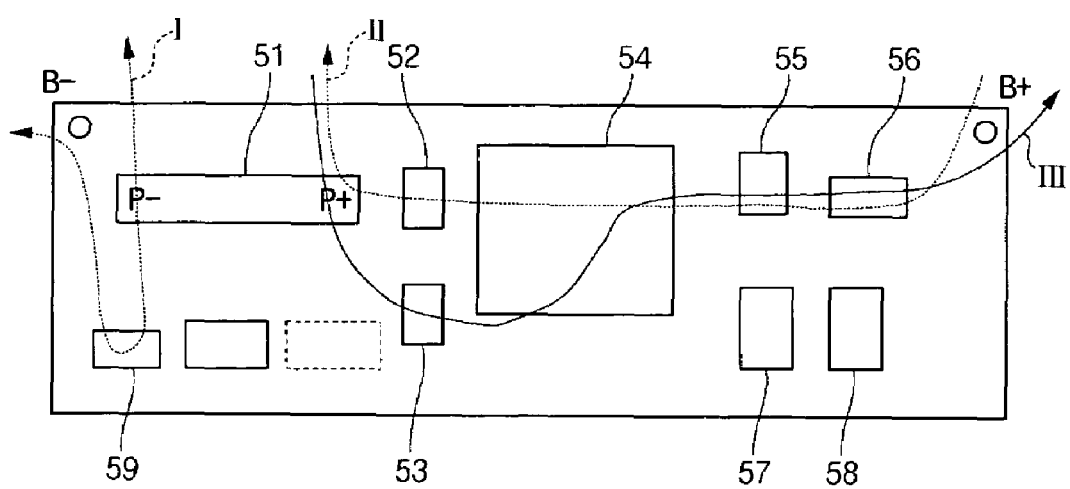
FIG. 5 is a plane view of a first substrate of the battery pack according to certain embodiments of the present invention.

With reference now to FIG. 5, a plane view of the first substrate of the battery pack according to the present invention is illustrated.

As described above, parts positioned on a high-current path are mounted on the first substrate 1 of the battery pack. Namely, the parts on a path between the positive (+) terminal of the battery pack and the positive (+) terminal of the battery and the parts on a path between the negative (−) terminal of the battery pack and the negative (−) terminal of the battery are mounted on the first substrate of the battery pack.

In FIG. 5, the first substrate includes an external terminal 51 that comprises the positive (+) and negative (−) terminals of the battery pack, an auxiliary discharge FET 52, a charge FET 53, a coil 54, a discharge FET 55, a fuse 56, capacitor 57 and capacitor 58, and a sensor resistor 59. FIG. 5 shows current paths during a charge of the battery pack. Arrow I represents a current path between the negative (−) terminal of the battery pack and the negative (−) terminal of the battery. Arrow II represents a current path between the positive (+) terminal of the battery to the positive (+) terminal of the battery pack during a discharge. Arrow III represents a current path between the positive (+) terminal of the battery pack to the positive (+) terminal of the battery.

As described above, the present invention isolates the parts of the battery pack positioned on a high-current path from the others by way of double (i.e., first and second) substrates, thereby preventing the effect of heat caused by the high current on the parts, such as damage to the integrated circuits in the battery pack or a deterioration of performance.

While this invention has been described in connection with what is presently considered to be the most practical and preferred embodiment, the invention is not limited to the disclosed embodiments and is intended to cover various modifications and equivalent arrangements included within the spirit and scope of the appended claims.

What is claimed is:

1. A battery pack, comprising:
   a battery having a positive (+) battery terminal and a negative (−) battery terminal, wherein the battery is chargeable using an external power source;
   a positive (+) battery pack terminal and a negative (−) battery pack terminal for coupling to the external power source, for charging the battery, and for supplying the power of the battery to an external load;
   a first substrate for mounting parts positioned on a high-current path between the positive (+) battery terminal and the positive (+) battery pack terminal or between the negative (−) battery terminal and the negative (−) battery pack terminal; and
   a second substrate for mounting peripheral circuits for controlling a charge/discharge of the battery spaced a distance from the first substrate, wherein the parts on the first substrate are controlled by parts on the second substrate.

2. The battery pack of claim 1, wherein the first substrate includes an external terminal having the positive (+) battery pack terminals and the negative (−) battery pack terminals.

3. The battery pack of claim 1, further comprising:
   at least one connector formed between the first and second substrates, for electrical signal connection between the two substrates.

4. The battery pack of claim 1, wherein the parts mounted on the first substrate include a charge/discharge transistor, a coil, a fuse positioned between the positive (+) terminal of the battery pack and the positive (+) terminal of the battery, and a sensor resistor positioned between the negative (−) terminal of the battery pack and the negative (−) terminal of the battery.

5. The battery pack of claim 4, wherein the parts mounted on the second substrate include an overcharge protection circuit for determining from the potential of a predefined cell of the battery whether or not the battery is overcharged, a gauging circuit and a communication line for measuring the state of charge of the battery and sending the result to an exterior, and a charge/discharge control and protection circuit for controlling the on/off state of the transistor according to the potential of the predefined cell of the battery and the output of the sensor resistor.

6. A battery pack, comprising:
   a battery; and
   a charge/discharge circuit in electrical communication with the battery, wherein the charge/discharge circuit comprises:
   a first substrate for mounting parts positioned on a high-current path;
   a second substrate for mounting low current flow parts, wherein the second substrate is spaced a distance from the first substrate; and
   an interlayer connector between the first substrate and the second substrate for providing electrical signal communication between the parts mounted on the first substrate and the parts mounted on the second substrate so that the parts mounted on the first substrate are controlled by the parts mounted on the second substrate.

7. The battery pack of claim 6, wherein the low current flow parts include peripheral circuits for controlling a charge/discharge of the battery.

8. The battery pack of claim 6, wherein the charge/discharge circuit includes a positive (+) terminal and a negative (−) terminal for coupling the battery pack to the external power source, for charging the battery, and for supplying the power of the battery to an external load.

9. The battery pack of claim 6, wherein the battery is selected from the group consisting of a Ni—Cd battery, a lead battery, a nickel metal hydride battery, a lithium ion battery, a lithium polymer battery, a lithium metal battery, and an air zinc battery.

10. A charge/discharge circuit for a rechargeable battery, comprising:
    a first substrate for mounting parts positioned on a high-current path;
    a second substrate for mounting low current flow parts, wherein the second substrate is spaced a distance from the first substrate; and
    an interlayer connector between the first substrate and the second substrate for providing electrical signal connection between the parts mounted on the first substrate and the parts mounted on the second substrate so that the parts mounted on the first substrate are controlled by the parts mounted on the second substrate.

11. The charge/discharge circuit of claim 10, wherein the first substrate further comprises a positive (+) battery pack terminal and a negative (−) battery pack terminal for coupling to an external power source, for charging the battery, and for supplying power of the battery to an external load.

12. The charge/discharge circuit of claim 10, wherein the first substrate further comprises a positive (+) battery pack terminal and a negative (−) battery pack terminal, and wherein the first substrate further comprises parts positioned on the high-current path between the positive (+) battery pack terminal and a positive (+) battery terminal.

13. The charge/discharge circuit of claim 10, wherein the first substrate further comprises a positive (+) battery pack terminal and a negative (−) battery pack terminal, and wherein the first substrate further comprises parts positioned on the high-current path between the negative (−) battery terminal and the negative (−) battery pack terminal.

* * * * *